Feb. 10, 1953 — D. MacGREGOR — 2,627,651
METHOD FOR ASSEMBLING PARTS OF GATE VALVES
Filed May 25, 1949 — 3 Sheets-Sheet 1

INVENTOR
David MacGregor
By Strauch & Hoffman
Attorneys

Feb. 10, 1953    D. MacGREGOR    2,627,651
METHOD FOR ASSEMBLING PARTS OF GATE VALVES
Filed May 25, 1949    3 Sheets-Sheet 2
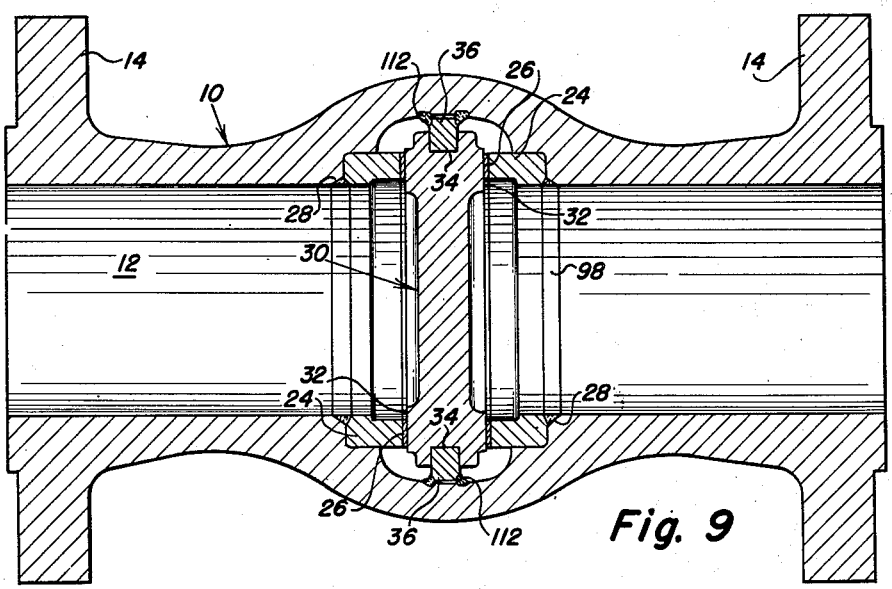
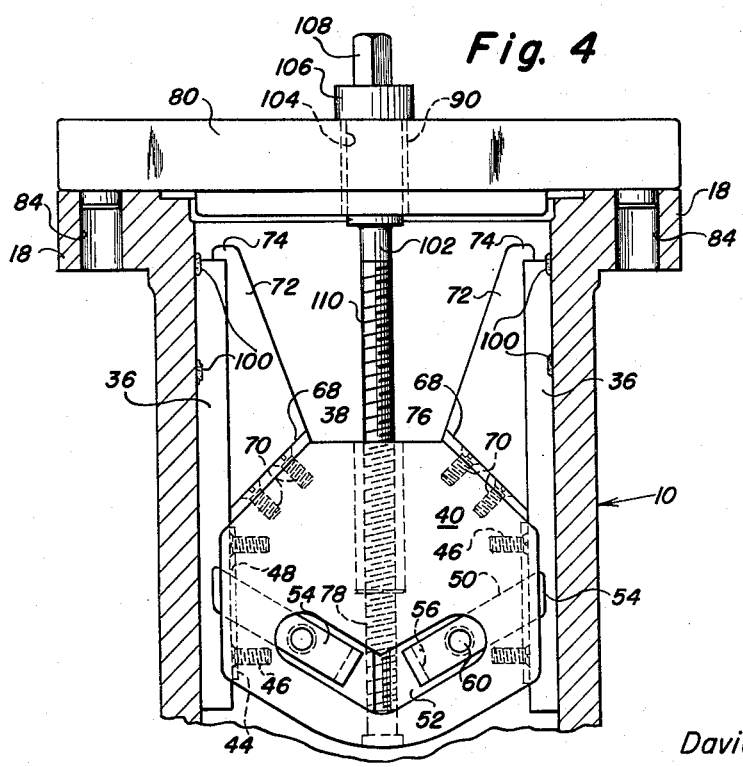
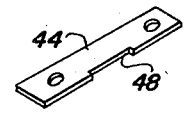
INVENTOR
David MacGregor
By Strauch & Hoffman
Attorneys INVENTOR
David MacGregor
By Strauch & Hoffman
Attorneys Patented Feb. 10, 1953

2,627,651

UNITED STATES PATENT OFFICE 2,627,651

METHOD FOR ASSEMBLING PARTS OF GATE VALVES

David MacGregor, Munster, Ind., assignor to Edward Valves, Inc., East Chicago, Ind., a corporation of Indiana Application May 25, 1949, Serial No. 95,254

1 Claim. (Cl. 29—157.1)

This invention relates to an improved method for assembling parts of a gate valve in the valve body and has for its primary object and purpose to facilitate the assembly of valve seat members and valve gate guiding ribs within the valve body with an accurate location of the guide ribs with respect to said seat members whereby excessive wear of the seat faces of said members in the operation of the valve will be obviated.

It has heretofore been the accepted practice, to first insert the two valve seat members and weld the same to the valve body, and then lap the seating faces of said members. The valve gate guide ribs were roughly cast with the valve body and then machined to proper dimensions. The inherent disadvantages in this method of assembly are the problems of machining the guide ribs to a uniformly accurate width and centering said ribs between the opposing faces of the valve seat members. For this reason the side faces of the guide ribs often vary in distance from the respective seat faces so that the valve gate member will not be guided in accurately centered relation between said seat faces. Improper clearances between the gate member and the guide ribs will cause said member to frictionally drag on the seat faces as it is moved to open or closed position, and thus result in excessive wear.

In accordance with my new method of assembly, wedging pressure is applied to the seat faces of the two seat members to move said seat members to their final assembled positions in the valve body and the guide ribs for the valve gate member are simultaneously moved to final position substantially in contact with the walls of the valve body and in accurate equidistantly spaced relation from the seat faces of said members. The valve seat members are then permanently welded to the valve body, after which the guide ribs are permanently welded to the valve body walls by longitudinally continuous fillet welds at each side thereof.

It is another object of the invention to provide an improved construction of wedge member for applying equal wedging pressures against the valve seat members to urge the same into abutting contact with internal shoulders on the valve body, together with means carried by said wedge member for releasably clamping the guide ribs thereto in accurately centered relation between the valve seat members.

An additional object of the invention resides in the provision of means on the wedge member for the connection therewith of devices supported on the valve body to push the wedge member downwardly between the valve seat members or to withdraw said wedge member after the seat members and guide ribs have been welded in their assembled positions.

A further object of the invention is to provide means for accurately assembling the parts of gate valves within the valve body which embodies an assembly fixture of simple and inexpensive construction, which may be easily and quickly applied or removed, resulting in certain production economies with more efficient operation of valves of this class.

With the above and other objects in view, the invention comprises the improved method for assembling the parts of gate valves as will hereinafter be more fully described, illustrated in the accompanying drawings and subsequently incorporated in the subjoined claim.

In the drawings wherein I have illustrated one practical embodiment of the mechanical means for practicing my new method and in which similar reference characters designate corresponding parts throughout the several views:

Figure 4 is a view similar to Figure 2 showing the puller rod connected with the wedge fixture for the removal thereof;

Figure 5 is a detail perspective view of one of the spacer plates for the guide ribs;

Figure 6 is a similar view of one of the clamping bars for the guide ribs;

Figure 9 is a horizontal sectional view taken substantially on the line 9—9 of Figure 7.

Figure 3:
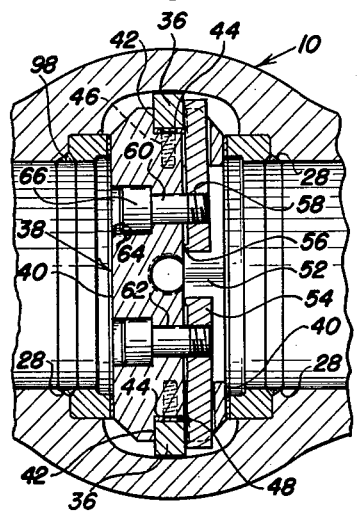
Figure 3 is a horizontal sectional view taken substantially on the line 3—3 of Figure 2.

Referring in further detail to the drawings, the valve body 10 is of the usual form, having the cylindrical fluid flow passage 12 and coupling flanges 14 at opposite ends thereof. The central portion of the valve body 10 is of enlarged diameter and merges with the upwardly projecting walls of a cylindrical chamber 16 having the coupling flange 18 at the upper end thereof. This chamber is connected through the transverse slot 20 in the body wall of the valve with the passage 12 and at each side thereof the valve body wall is internally formed with the annular rectangular shoulders 22.

Figure 7:
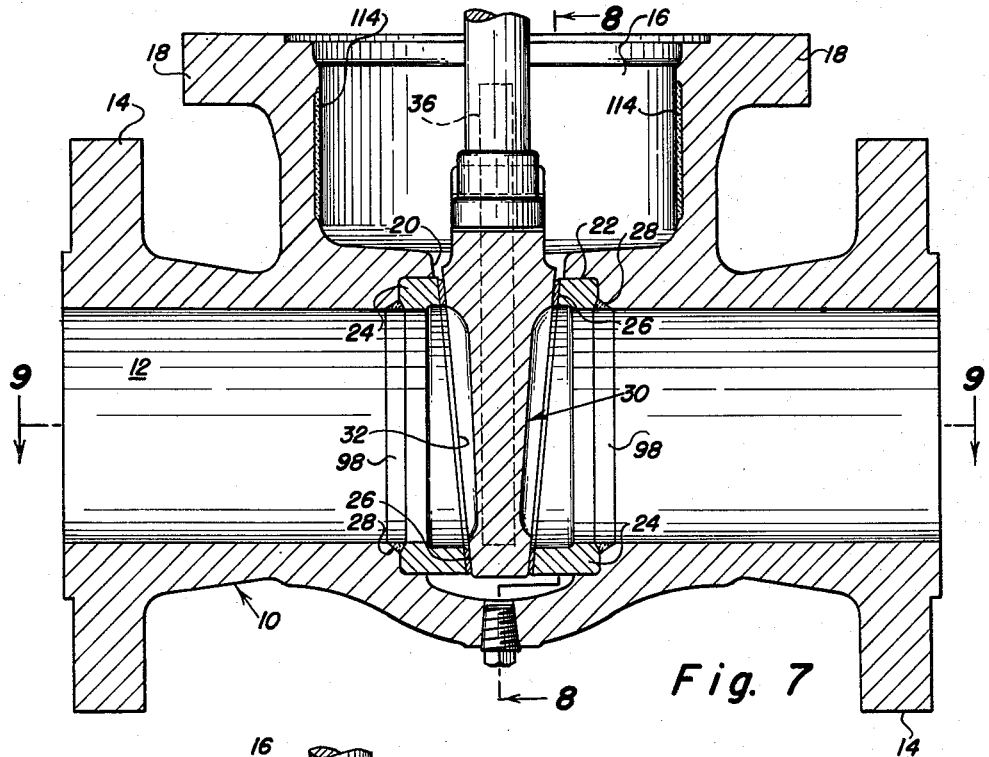
Figure 7 is a vertical longitudinal section showing the valve gate member in its closed position upon the valve seats.

Valve seat members or rings 24, preferably of steel, are inserted downwardly through the slot 20 and positioned upon the respective shoulders 22 of the valve body. These members have opposed hardened seat faces 26 of "Stellite" and are inclined downwardly and inwardly in convergent relation to each other as clearly shown in Figures 1 and 7 of the drawings. At the top of each of the seat members an external guide line (not shown) is provided thereon for the purpose of accurately centering the seat faces 26 with respect to a vertical plane bisecting the valve body. Each seat member and the wall of the valve body are provided with mating annular grooves 28 to receive welding metal.

The valve gate member 30 of general rectangular form is vertically movable between the valve seat members through the slot 20 and is provided on opposite sides thereof with the annular highly finished seating faces 32 which are vertically inclined at substantially the same angle as the inclined seat faces 26 of the respective seat members 24. The opposite vertical edges of the gate member 30 are provided with grooves or channels 34 which slidably received guide ribs 36 welded to the valve body wall and the wall of chamber 16 with their opposite side faces in equidistantly spaced relation from the seat faces 26 of the members 24. Such accurate positioning of the valve seat members 24 and guide ribs 36 is obtained by the use of a special fixture which will now be described.

Figure 1:
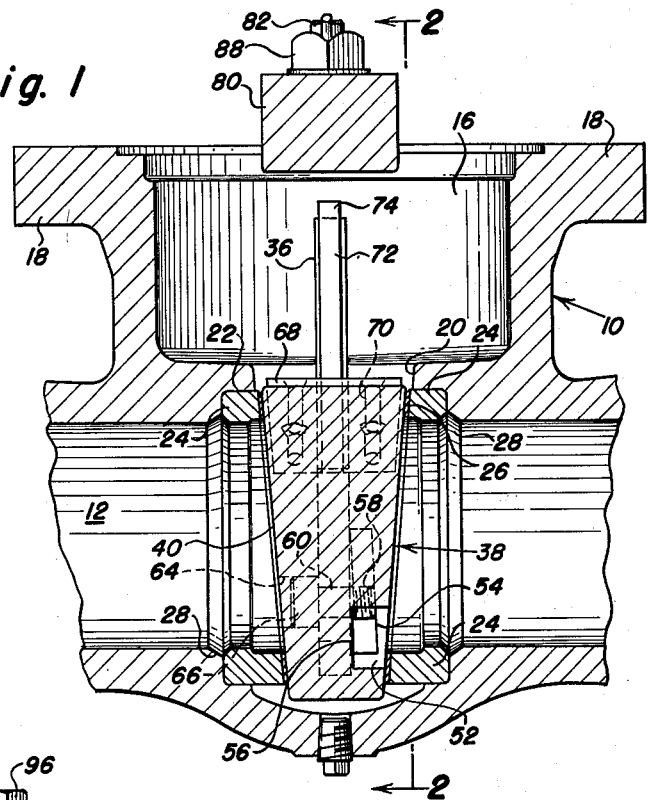
Figure 1 is a vertical sectional view through the valve body taken substantially on the line 1—1 of Figure 2 showing the wedge fixture in its applied position between the two valve seat members.
Figure 2:
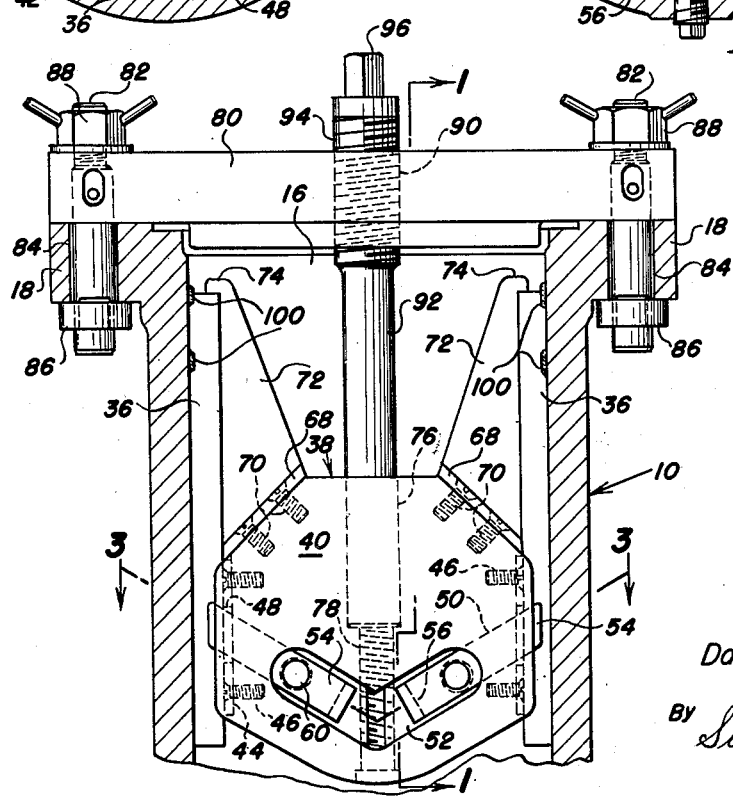
Figure 2 is a vertical transverse section taken substantially on the line 2—2 of Figure 1, the valve body being partly broken away.

As shown in Figures 1, 2 and 3 of the drawings, the fixture comprises a wedge member 38 having opposite side faces 40 convergently inclined downwardly at substantially the same angle as the seat faces 26 of the members 24 and the annular side faces 32 of the valve gate member 30. The wedge member 38 has vertical edge portions provided with rectangular grooves or channels 42 and to the base wall of each of these grooves a spacer plate 44 is secured by screws 46. One vertical edge of this plate is provided with a shallow rectangular recess 48 in registration with the outer end of an obliquely inclined rectangular opening 50 formed in the wedge member which communicates at its inner end with one end of a V-shaped recess 52 formed in one side face of the wedge member 38. A clamping bar 54 extends through each of the openings 50 with its inner end disposed in one leg of the recess 52 and terminating in a shallow projection or protuberance 56 in bearing contact with the base wall of the recess 52. In spaced relation from this recess the bar 54 is provided with a transverse threaded opening 58 to receive the threaded end of an adjusting screw 60 rotatably mounted in an opening 62 in wedge member 38, said opening being counterbored as at 64 to receive the head 66 of the screw which is provided with a wrench receiving socket.

To the upper end of the wedge member 38 a pair of brackets are secured, each of said brackets having a base 68 rigidly fixed to the wedge member by screws 70 and a central upwardly extending arm 72. The outer side edges of the bracket arms are in alignment with the respective grooves 42 in the wedge member, and each arm terminates at its upper end in an outwardly projecting stop lug 74.

The guide ribs 36 are accurately machined to the proper dimensions and slidably fitted within the grooves 42 of the wedge member with their upper ends in contact with the stop lugs 74. The screws 60 are then adjusted so that the outer ends of the clamping bars 54 move inwardly into the recesses 48 of spacer plates 44 and against the adjacent side faces of the ribs 36 whereby the ribs are clampingly held in fixed relation to the wedge member.

The wedge member 38 is further provided centrally thereof with a cylindrical bore 76 opening upon the upper end of the wedge member and with a relatively small diameter coaxial threaded opening 78 extending from the base of the bore 76 through the lower portion of the wedge member 38.

After the guide ribs 36 have been clamped to the wedge member as above explained, the assembly is then inserted downwardly through slot 20 between the valve seat members until each side face 40 of the wedge member is in substantial contact with the annular seat face 26 of the respective seat members 24. A bar 80 is now positioned across the top of the valve body chamber 16 with the ends thereof contacting the upper surface of the coupling flange 18. Each end of this bar carries a clamping rod 82 extending downwardly through a bolt receiving opening 84 in the flange 18 and having a collar 86 fixed on its lower end for contact with the bottom face of said flange. The rods 82 have threaded upper end portions to receive the clamping nuts 88 and, as will be apparent, by the proper adjustment of these nuts the bar 80 is rigidly clamped at its ends upon the flange 18. This bar is centrally provided with a threaded opening 90 which receives the threaded section 94 of a push rod 92 terminating at its upper end in the wrench receiving boss 96. The lower end of push rod 92 is rotatably received in the bore 76 of the wedge member 38 so that by rotation of said rod in the bar 80, it moves axially downward against the base wall of the bore 76 and forces said wedge member carrying the ribs 36 downwardly between the valve seat members 24. Thus wedging pressure is applied by the inclined side faces of the member 38 against the seat faces 26 of the two valve seat members 24 so that they are urged laterally in opposite directions into tight contact with the shoulders 22 on the wall of the valve body. The ribs 36 in light contact with the inner surfaces of the valve body wall are thus simultaneously accurately positioned and centered between the valve seat faces 26. The pressure torque applied to the wedged member should be approximately 25 foot pounds to firmly hold the seat members against the respective shoulders but not sufficient to deform the valve body. The annular welds 98 are now applied in the mating grooves 28 on the valve seat members and the valve body. The wedge member should be retightened to compensate for shrinkage of the weld which tends to pull the valve seat away from the wedge member.

After the two valve seat members 24 have thus been permanently welded in place, spaced tack-welds 100 are then applied along each side of the guide ribs 36 at their upper end portions within the chamber 16 of the valve body. In applying the welds to the seat member and guide ribs, the wedge fixture should be protected against weld splatter by the application thereto of a suitable covering material.

The push rod 92 is now removed and a retracting rod 102 substituted therefore. This rod has a large diameter section 104 rotatably fitted through opening 90 of the bar 80 in clearance relation to the thread thereof and having a head 106 on its upper end provided with the wrench receiving boss 108. The threaded section 110 of said rod is of reduced diameter and extends through the bore 76 of the wedge member and is threaded in the opening 78 thereof. It will thus be apparent that after releasing the clamping pressure of bars 54 on ribs 36, by rotatably adjusting the rod 102, the wedge fixture may be drawn upwardly to disengage its side faces 40 from the seat faces 26 of members 24, and then removed together with bar 80 from the valve body. Additional tack-welds are now applied to the lower end portions of ribs 36 at each side thereof. Of course the length of the guide ribs and the number of tack-welds will vary with the size of the valve.

Figure 8:
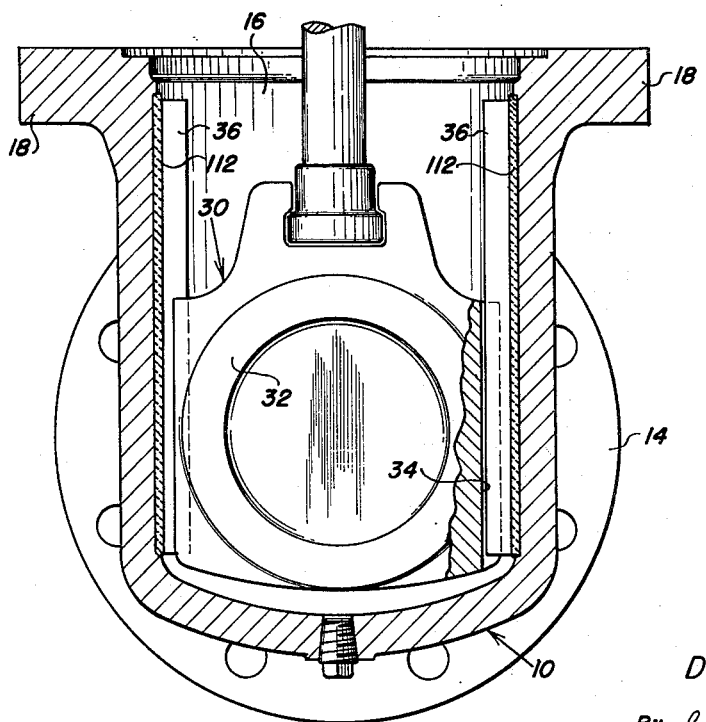
Figure 8 is a transverse section taken substantially on the line 8—8 of Figure 7.

Finally continuous fillet welds, indicated at 112 in Figures 8 and 9 of the drawings, are applied throughout the length of the guide ribs 36 along each side thereof, thus integrally connecting these ribs with the wall of the valve body and insuring against any possible displacement of said guide ribs from their accurately centered relation to the spaced seat faces 26 of the valve seat members 24. The application of these fillet welds may tend to somewhat contract or distort the wall of the valve body. For example, a valve with a ten inch bore and a one inch wall thickness is pulled out of round approximately .040 inch, the distance between the opposed wall sections carrying the ribs increasing and the distance between the other walls decreasing. Some slight longitudinal deformation may also be produced by the fillet welds. Therefore a number of corrective welds, as indicated at 114 in Figure 7, may be applied to the valve body wall forming the chamber 16. The longitudinal and circumferential distortions of the valve body caused by shrinkage at the fillet welds will be compensated for by properly placed corrective welds 114 which cause compensating shrinkage at points circumferentially spaced from the fillet welds. The number and size of these corrective welds will also vary with the size of the valve. These welds should terminate at upper ends on a line with the upper ends of the guide ribs 36.

From the above description, it will be seen that I have provided a novel method, in which the valve seat members and the guide ribs are simultaneously positioned and held by a simple form of wedge fixture with the ribs in accurately centered relation between the valve seat faces. Any possible relative displacement of the parts as they are permanently welded to the valve body is precluded, so that the valve gate member 30 in its operation will be accurately guided against lateral deviation from a straight line vertical movement, owing to the minimum clearance between the side faces of the guide ribs and the side walls of the grooves 34 in the gate member 30. Thus frictional drag and excessive wear by the seating faces 32 on valve member 30 upon the seat faces 26 of the rings or seat members 24 is effectively prevented.

I have found that the wedge member 38 with the rib clamping means 54 as above described provides an easily operable means for rigidly holding the guide ribs 36 against relative displacement and for movement to an accurately centered position between the valve seat members. While this disclosed embodiment of the invention is simple and inexpensive, it will be understood that other equivalent means for releasably clamping the guide ribs to the wedge member may be employed. It will further be understood that the means above described for adjusting the wedge member to its operative position and for retracting or withdrawing the same from the valve body is largely illustrative, and if desired other means may be provided for this purpose.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

The method of assembling opposed valve seat members and valve gate guide ribs within an integral valve body having shouldered recesses for receiving said seat members comprising the steps of inserting said seat members into said recesses in said body in approximately properly assembled position, assembling said guide ribs in properly spaced relation in pressure applying means externally of said body, forcibly urging said pressure applying means carrying said guide ribs into said body to apply pressure to said seat members to urge said seat members apart into engagement with said shouldered recesses and to locate said ribs in substantially operating position with respect to said seat members in light contact with the valve body wall, welding said seat members and a portion of each of said ribs to said body, removing said pressure applying means, applying fillet welds along each side of said ribs to permanently secure the same to the valve body, and applying circumferentially spaced corrective welds to the valve body wall above said seat members and circumferentially spaced from said guide ribs to compensate for the distorting effect of said fillet welds.

DAVID MacGREGOR.

REFERENCES CITED

The following references are of record in the file of this patent:

UNITED STATES PATENTS

| Number | Name | Date |
| --- | --- | --- |
| 1,290,091 | Cole | Jan. 7, 1919 |
| 1,889,986 | Haywood | Dec. 6, 1932 |
| 2,034,418 | Plant | Mar. 17, 1936 |
| 2,065,628 | Taylor | Dec. 29, 1936 |
| 2,261,489 | Venton | Nov. 4, 1941 |
| 2,419,243 | Allen | Apr. 22, 1947 |
| 2,431,732 | Colbert | Dec. 2, 1947 |